Patented Oct. 13, 1942

2,298,679

UNITED STATES PATENT OFFICE 2,298,679

METHOD OF MAKING RESISTORS AND RESISTANCE MATERIALS

Carl J. Christensen, Flushing, N. Y., assignor to Bell Telephone Laboratories, Incorporated, New York, N. Y., a corporation of New York No Drawing. Application April 25, 1941, Serial No. 390,336

12 Claims. (Cl. 201—76)

This invention relates to the preparation of resistor elements and resistance materials. More particularly, it relates to the preparation of resistance materials comprising several oxides and to the subsequent heat treatment thereof to form resistor elements.

One object of this invention is to make a more intimate mixture than heretofore of the oxides which are being combined into resistance material.

A further object is to produce oxides of a higher degree of purity than have been heretofore obtainable.

Another object is to improve both the electrical and the physical characteristics of oxidic resistors.

One feature of the invention resides in preparing an intimate mixture of compounds capable of conversion to the desired oxides and then carrying on the conversion to produce intimately mixed oxides.

Another feature involves mechanical working of the materials at the proper stages in the processes, i. e., both before and after calcining.

A further feature resides in the coordination of the calcining treatment with later heat treatment of the oxides, particularly as to temperature.

Other objects and features of this invention will be more clearly and fully understood from the following description of illustrative embodiments thereof.

Resistors having a high negative temperature coefficient of resistance have been prepared from intimately mixed oxides of certain metals, heat treated at suitable temperatures. Various combinations of the oxides of manganese, nickel, cobalt and copper have been employed for such resistors.

One method of producing resistors of the type noted is to intimately mix finely divided oxides in suitable proportion, form the mixture into a body of desired size and configuration and heat treat said body. The heat treatment is usually at a temperature between 800° and 1450° C.

There appears to be a tendency for many semiconductive materials, when formed into bodies and heat treated, to have such a high resistance that they cannot be used as conductive bodies for many purposes. In many cases, however, the technique of preparation may be so controlled as to give relatively low resistance values. Some conditions which have been found to produce very high resistances are incomplete mixing of ingredients, the presence of certain impurities and porosity of the resistance bodies made from these materials.

It is often difficult to obtain in commercial quantities oxides of the requisite degree of purity and with requisite physical characteristics. Moreover, when substantially pure oxides are obtainable some difficulties have been encountered in getting a good mixture and proper mechanical structure in finished resistor elements.

Many salts of metals may be converted to their oxides by calcining in an atmosphere containing oxygen. For the purposes of this invention advantageous results can be obtained by calcining relatively insoluble salts such as carbonates or oxalates. Other water soluble salts such as those of the common acids, i. e., sulphates, nitrates and chlorides, may also be employed. If soluble salts are employed, they will be converted to insoluble salts before calcining.

If it is desired to make a resistor containing combined oxides of, for example, manganese, nickel and cobalt, the raw material may be the sulphates of these metals, which may be obtained in a high state of purity. Since control of the resistance characteristics of metal oxide resistance materials may be obtained by determining the relative amounts of the metal atoms in the composition, the sulphates are mixed in proper proportion to obtain the desired atomic ratio of metals.

The selected sulphates in proper proportion are put into a single solution. Sufficient sodium carbonate is added to the solution to coprecipitate the metal ions as carbonates. The precipitation may be from either a hot or cold solution, but better results are obtained from the hot solution. This produces precipitates with a less hydrous or gelatinous nature which may be more easily washed free from soluble salts than those precipitated from a cold solution. The precipitate is then thoroughly washed with hot distilled water to remove sodium and sulphate ions. This washing must be thorough in order that no sodium sulphate appears as an impurity. The quantity of water should be held to a minimum since these carbonates are sufficiently soluble and their solubilities are sufficiently different from each other, so that washing in large quantities of water may change the composition of the mixture. The solubility in the wash water can be considerably diminished if the wash water is saturated with carbon dioxide.

The washed precipitate is then dried at a temperature in the order of 105° C. and then worked to a loose powder, for example, by rubbing in a mortar or grinding in a suitable mill. Care must be taken here not to introduce impurities from the grinding surfaces.

The loose powdery material is then converted to oxides of the metals by calcining in air for six or more hours at a temperature within the range 600° to 1000° C. During calcining, the material should be so disposed that atmospheric oxygen has access to all parts thereof. One way this may be done is to have the material spread out in a thin layer. Circulation of air throughout the material may be expedited by using a container or dish that is relatively porous.

Particularly advantageous results may be obtained by continuously stirring the material during at least the first part of the calcining operation. Due to the exothermic character of the change from some carbonates to oxides, such as is encountered, for example with manganese carbonate when it changes from two valent manganese in the carbonate to three valent manganese in the oxide, can give enough heat, if a portion of the material is confined in a thermal insulating layer of the already formed loose oxide, to cause a portion of the oxide to be sintered in this calcining operation. If this occurs the resulting oxide powder is likely to be lumpy and less desirable as a material from which to produce a finished resistor.

The temperature of calcining is also important, since by controlling this the degree of shrinkage in the later sintering operation to form the finished resistor can be predetermined. In general, it can be said that as the calcining temperature is increased the shrinkage at sintering is decreased. For the production of some types of resistors wherein metallic wires are embedded, the shrinkage at sintering determines whether or not the resistor can be successfully made. If the shrinkage is too great during the sintering operation, the unit cracks because the embedded wire does not alter its dimensions in the sintering operation.

The calcined material is worked mechanically as by rubbing in a mortar or a mill to a flaky consistency.

The intimately mixed finely divided oxides may then be formed into bodies of suitable configuration and heat treated.

One useful body form of resistor unit is the small bead. This may be made by mixing the resistance material into a paste with water and depositing small beads thereof on parallel wires. The beads are dried to remove the water and then heat treated. The wires should be of a high melting, conducting material, such as platinum, in order to stand the subsequent heat treatment. These wires serve as support means, electrodes and connecting leads for the resistor unit.

A disc type of resistor may be made by pressing the dry material in a die of suitable size and configuration. Due to the flakiness of the material the particles interlock and form a sufficiently strong disc unit to be manipulated in the unfired state. Electrodes of finely divided metallic material may be formed integrally with the disc faces while pressing or other types may be applied after heat treatment. Other body forms such as extruded rods or tubes may be made.

The formed bodies either bead, pressed disc, extruded rod or tube, or some other desired shape may then be heat treated at 800° to 1450° C. The temperature of heat treatment should be correlated with the previous calcining temperature as previously indicated. In general, the temperature of heat treatment to be effective, must be higher than the calcining temperature.

The range of calcining temperatures permissible is from about 600° to 1000° C. If a temperature below 600° C. is employed, the material does not heat treat well and tends to crack. This cracking may be due to the decomposition of residual carbonates at the heat treating temperature. When calcining temperatures above 1000° C. are used sintering takes place during the calcining. Such material is hard to break up and does not press well into discs. Furthermore, such material does not sinter well during heat treatment even if higher than normal temperatures are applied thereto. This tends to give units which are very porous, mechanically weak, and not well cohered.

If for any reason it is necessary to calcine at a temperature higher than 1000° C. reasonably good results may still be obtained if the calcined material can be extremely well comminuted. It must be remembered, as has been indicated in connection with mechanical working before calcining, that impurities must not be introduced during the comminuting step.

If sufficiently pure and reproducible carbonates of the required metals can be obtained, the process may be somewhat varied. In this case the carbonates may be thoroughly mixed in a finely divided state and calcined to the oxides. An advantageous method of obtaining an intimate mixture of the carbonates is to mix them into a thin water suspension. A thorough mixture may be obtained by circulating the suspension through a colloid mill, or by prolonged grinding in a ball mill. The water is then filtered off and the material dried at about 105° C. From here on the process is the same as the one previously described.

The first of the previously described modifications of the process may be carried out by substituting nitrates or chlorides of the proper metals for sulphates or by converting any of these soluble salts to oxalates instead of carbonates. The oxalates may also be used as the initial product in the second modification of the process, instead of the carbonates.

Oxidic resistors made from material prepared in accordance with either of the above-described methods have proved to be better in several respects than those made from the purest commercial oxides obtainable. The specific resistance is lower due to the more intimate mixing of the constituents, the dense sintering of the resistor body and the low concentration of impurities. The ageing characteristics of resistors prepared in accordance with these methods are also superior to those usually obtained by the use of commercial oxides.

Although the invention has been disclosed with reference to specific embodiments thereof, it will be understood that it is not restricted thereto but is limited in scope by the appended claims only.

What is claimed is:

1. The method of making a resistor composed of the combined oxides of a plurality of the metals manganese, nickel, cobalt and copper, that comprises preparing an intimate wet mixture of insoluble salts of said plurality of metals in proper proportion to obtain the desired ratio of metal atoms in the combined oxides, said salts being capable of conversion to oxides by heating in air at below 1000° C., drying the mixture, mechanically working the dried mixture of insoluble salts to a fluffy texture, calcining in air between 600° and 1000° C. with the material so disposed that atmospheric oxygen has access to all parts thereof, mechanically working the resulting mixed oxides to a flaky consistency, forming said oxides into a body, and heat treating said body at 800° to 1450° C. in a controlled atmosphere, the heat treating temperature being higher than the calcining temperature.

2. In a method of making a resistor device comprising a self-sustaining body of material consisting of the combined oxides of a plurality of the metals manganese, nickel, cobalt and copper, said method comprising calcining at from 600° to 1000° C. intimately mixed insoluble salts of said plurality of metals to produce oxides thereof, forming the oxides into a body and heat treating said body, the step of controlling shrinkage during said heat treating that comprises maintaining during the calcining a suitable temperature within said calcining temperature range, the degree of shrinkage being inversely proportional to said calcining temperature.

3. In a method of making a resistor of the type comprising a body of resistance material having metallic electrodes embedded therein, said material consisting of the combined oxides of a plurality of the metals manganese, nickel, cobalt and copper, said method comprising calcining to oxides intimately mixed insoluble salts of said plurality of metals, forming the oxides into said body on the electrodes and heat treating the body to sinter the material, the step of reducing the heat treating shrinkage sufficiently to avoid cracking around the electrodes while maintaining relatively high density of the body that comprises maintaining the calcining temperature between 750° and 850° C.

4. The method of making a resistor composed of the combined oxides of a plurality of the metals manganese, nickel, cobalt and copper, that comprises preparing an intimate wet mixture of carbonates of said plurality of metals in proper proportions to obtain the desired ratio of metal atoms in the combined oxides, drying the mixture, mechanically working the dried mixed carbonates to a fluffy texture, calcining in air between 600° and 1000° C. with the material so disposed that atmospheric oxygen has access to all parts thereof, mechanically working the resulting mixed oxides to a flaky consistency, forming said oxides into a body and heat treating said body at 800° to 1450° C. in a controlled atmosphere, the heat treating temperature being higher than the calcining temperature.

5. The method of preparing a resistance material consisting of a plurality of the oxides of the metals manganese, nickel, cobalt and copper, that comprises thoroughly mixing pure compounds of said plurality of metals other than their oxides and obtaining therefrom an intimate wet mixture of the carbonates of said plurality of metals, drying this mixture and mechanically working the dry mixture to a fluffy consistency, heating the fluffed mixture between 600° and 1000° C. in air until all of the carbonates are converted to oxides, mechanically working the oxides to a fluffy consistency, forming said oxides into a body and heat treating said body in a controlled atmosphere between 800° and 1450° C. to form a dense oxidic resistor, the temperature of heat treating being higher than that employed in the conversion of carbonates to oxides.

6. The method of making a resistor consisting of a plurality of the oxides of the metals manganese, nickel, cobalt and copper, that comprises thoroughly mixing pure compounds of said plurality of metals other than their oxides and obtaining therefrom an intimate wet mixture of the carbonates of said plurality of metals, drying this mixture and mechanically working the dry mixture to a fluffy consistency, heating the fluffed mixture between 750° and 800° C. in air until all of the carbonates are converted to oxides, mechanically working the oxides to a fluffy consistency, wetting the mixed oxides and forming them into a small body around portions of spaced electrodes, drying the body and heat treating said body in a controlled atmosphere at about 1200° C.

7. The method of making a resistor consisting of a plurality of the oxides of the metals manganese, nickel, cobalt and copper, that comprises thoroughly mixing pure compounds of said plurality of metals other than their oxides and obtaining therefrom an intimate wet mixture of carbonates of said plurality of metals, drying this mixture and mechanically working the dry mixture to a fluffy consistency, heating the fluffy mixture at a temperature of about 650° C. in air until all of the carbonates are converted to oxides, mechanically working the oxides to a flaky consistency, pressing the oxides into a disc and heat treating said disc in a controlled atmosphere at about 1200° C.

8. The method of preparing a resistor composed of the combined oxides of a plurality of the metals manganese, nickel, cobalt and copper, that comprises putting into a single solution a water soluble salt of each of said plurality of metals, the oxide of which is required, coprecipitating the metal ions as salts insoluble in water and capable of conversion to oxides by heating in air at a temperature below 1000° C., washing the precipitate to remove all soluble impurities, drying the precipitate, mechanically working the dried precipitate to a fluffy consistency, calcining the fluffed precipitate in air at a temperature within the range 600° to 1000° C., said precipitate being so disposed that atmospheric oxygen has access to all parts thereof, forming the resulting mixed oxides into a body and sintering at 800° to 1450° C. in a controlled atmosphere, the sintering temperature being higher than the calcining temperature.

9. The method of making a resistor consisting of the combined oxides of a plurality of the metals manganese, nickel, cobalt and copper, that comprises making a single solution of a common acid salt of each of said plurality of metals in proper proportions to give a required atomic ratio of metals, heating the solution and coprecipitating the metal ions as salts insoluble in water and capable of conversion to oxides by heating in air below 1000° C., washing the precipitate in water to remove all soluble impurities, drying the precipitate, fluffing the dried precipitate by mechanical working, heating the fluffed precipitate in air between 600° and 1000° C. until all of the insoluble salts are converted to oxides, mechanically working the oxides to a fluffy consistency, forming the fluffed oxides into a body, and heat treating the body in a controlled atmosphere at a temperature between 800° and 1450° C., the heat treating temperature being higher than the calcining temperature.

10. The method of preparing a resistance composed of the combined oxides of a plurality of the metals manganese, nickel, cobalt and copper, that comprises putting into a single solution a sulphate of each metal, the oxide of which is required, coprecipitating the metal ions as carbonates, washing the precipitate to remove all soluble impurities, drying the precipitate, mechanically working the dry precipitate to a fluffy consistency, calcining the fluffed precipitate in air at a temperature within the range 600° to 1000° C., said precipitate being so disposed that atmospheric oxygen has access to all parts thereof, forming the resulting mixed oxides into a body and sintering at 800° to 1450° C. in a controlled atmosphere, the sintering temperature being higher than the calcining temperature.

11. The method of preparing a resistance composed of the combined oxides of a plurality of the metals manganese, cobalt and copper, that comprises thoroughly mixing in a thin water suspension, carbonates of said plurality of metals, the oxides of which are required, removing the water and drying the carbonates, mechanically working the dried carbonates to a fluffy consistency, calcining the fluffy precipitate in air at a temperature within the range 600° to 1000° C., forming the resulting oxide mixture into a body and heat treating at 800° to 1450° C. in a controlled atmosphere, the heat treating temperature being higher than the calcining temperature.

12. The method of making a resistor composed of the combined oxides of several metals, that comprises preparing an intimate wet mixture of finely divided insoluble salts of each metal, drying the mixture, mechanically working said mixture to a fluffy consistency, heating the mixture in the presence of atmospheric air to convert all of the insoluble salts to their oxides, mechanically working the mixture to a flaky texture, forming the flaky mixture into a body and sintering said body.

CARL J. CHRISTENSEN.